United States Patent [19]

Maniwa et al.

[11] Patent Number: 5,241,662
[45] Date of Patent: Aug. 31, 1993

[54] INTEGRATED CIRCUIT CARD MEMBER FOR USE IN DATA PROCESSING DEVICE

[75] Inventors: Yoshio Maniwa, Yokohama; Daisuke Abe, Sanngo; Makoto Kohzu; Takashi Morita, both of Yokohama, all of Japan

[73] Assignee: Ricoh Company, Ltd., Tokyo, Japan

[21] Appl. No.: 563,815

[22] Filed: Aug. 6, 1990

Related U.S. Application Data

[63] Continuation of Ser. No. 296,373, Jan. 9, 1989, abandoned, which is a continuation of Ser. No. 17,621, Feb. 24, 1987, abandoned.

[30] Foreign Application Priority Data

Feb. 24, 1986 [JP] Japan .................. 61-37215
Feb. 24, 1986 [JP] Japan .................. 61-42146
Feb. 27, 1986 [JP] Japan .................. 61-37214

[51] Int. Cl.⁵ .............................................. G06F 12/00
[52] U.S. Cl. ........................... 395/425; 364/DIG. 2; 364/970; 364/970.5; 364/960; 364/960.6; 364/960.7
[58] Field of Search ............. 395/800, 400, 425, 325

[56] References Cited

U.S. PATENT DOCUMENTS

| | | | |
|---|---|---|---|
| 3,975,714 | 8/1976 | Weber et al. | 340/172.5 |
| 4,296,476 | 10/1987 | Mayer et al. | 364/900 |
| 4,368,515 | 1/1983 | Nielsen | 364/200 |
| 4,435,779 | 3/1984 | Mayer et al. | 340/747 |
| 4,460,972 | 7/1984 | Homan et al. | 364/900 |
| 4,481,572 | 11/1984 | Ochsner | 364/200 |
| 4,556,958 | 12/1985 | Ugon | 364/200 |
| 4,686,525 | 8/1987 | Nagata | 340/735 |
| 4,698,750 | 9/1987 | Wilkie et al. | 395/425 |
| 4,715,006 | 12/1987 | Nagata | 364/523 |

FOREIGN PATENT DOCUMENTS

| | | |
|---|---|---|
| 3409776 | 9/1984 | Fed. Rep. of Germany . |
| 3436033 | 11/1985 | Fed. Rep. of Germany . |
| 3509633 | 9/1986 | Fed. Rep. of Germany . |

*Primary Examiner*—Kevin A. Kriess
*Attorney, Agent, or Firm*—Cooper & Dunham

[57] ABSTRACT

A plug-in data cartridge for a printer or a similar device. The cartridge contains an addressable memory and an address generator. In response to a designation of a starting address, the address generator in the cartridge addresses a sequence of memory locations of the memory which is also in the cartridge so that the data can be supplied to the printer. Because only a few starting addresses need to be designated, a low number of address lines is needed, and the number of pins for plugging in the cartridge can be reduced.

19 Claims, 10 Drawing Sheets

| SIGNAL / MODE | $\overline{CE}$ | $\overline{OE}$ | Vpp | Vcc | OUTPUT (D0-D7) |
|---|---|---|---|---|---|
| READ OUT | L | L | +5V | +5V | DATA OUTPUT |
| OUTPUT DISABLE | H | H | +5V | +5V | HIGH IMPEDANCE |
| STAND-BY | H | X | +5V | +5V | HIGH IMPEDANCE |
| PROGRAM | L | H | Vpp | +6V | DATA INPUT |
| PROGRAM TEST | L | L | Vpp | +6V | DATA OUTPUT |
| PROGRAM PROHIBIT | H | X | Vpp | +6V | HIGH IMPEDANCE |

INTEGRATED CIRCUIT CARD MEMBER FOR USE IN DATA PROCESSING DEVICE

This is a continuation of application Ser. No. 07/296,373, filed Jan. 9, 1989, which in turn is a continuation of Ser. No. 07/017,621 filed Feb. 24, 1987, both now abandoned.

FIELD OF THE INVENTION

This invention relates to an integrated circuit card member and more particularly to an integrated circuit card member detachably connected to a data processing device.

BACKGROUND OF THE INVENTION

An integrated circuit (hereinafter called IC) card member can be detachably connected to a data processing device such as a printer to function as a part of the device. The data processing device can provide different functions depending on which IC card member is used.

Figure 1:
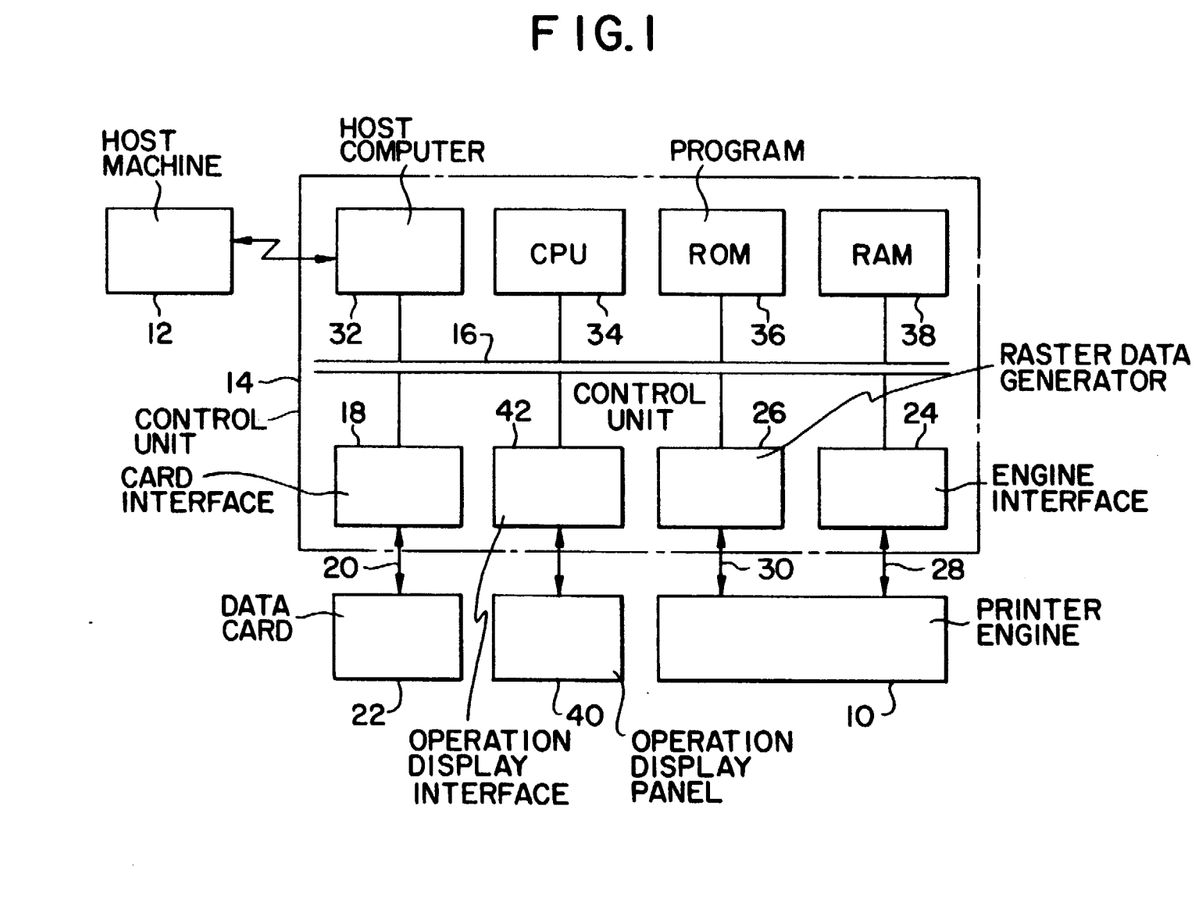
FIG. 1 is a block diagram showing an embodiment in which the invention is applied to a laser beam printer as a data processing device.

Typically, IC cards such as memory cards comprise mask ROM (Read Only Memory) means or RAM (Random Access Memory) means and are connected to a data processing device by directly connecting the data, address and control lines to corresponding lines of the Central Processing Unit (hereinafter called CPU) of the main device, that is, a control unit 14 as shown in FIG. 1.

When mask-ROM type IC cards are used, it can take a long time (perhaps months) to design, test and implement the mask needed for the expected function. When a RAM type IC card is used there is no such delay, but the card must have therein a battery means in order to prevent loss of stored information when power is turned off. Accordingly, the RAM type card has a disadvantage in price and reliability. An IC card using an electrically erasable-programmable ROM (hereinafter called EPROM) type also has a disadvantage in price.

Problems can arise when the CPU bus of the data processing device is directly connected to that of the IC card member. For example, if the number of connector pins needed to connect the IC card with data processing device increases, the card may be made less convenient and more expensive. Such problems can arise in devices having a 16-bit bus. Further, since the bit-rate of the CPU bus is high, the extension of the CPU bus to the outside of the device increases the risk of errors due to electromagnetic interference. Further, when the IC card is pulled out of the data processing device, there is a risk that the CPU would be adversely affected through the connection to the CPU bus.

SUMMARY OF THE INVENTION

It is therefore an object of the invention to provide inexpensive and rapidly-developable integrated circuit card member.

It is another object of the invention to provide an integrated circuit card member which overcomes problems of prior integrated circuit card members.

It is a further object of the invention to provide a data processing device to which an integrated circuit card member can be connected easily and reliably.

In order to achieve such objects, in a first aspect of the invention there is provided an integrated circuit card member detachably connected to a data processing device which includes memory means for storing data; address means for sequentially generating address signals to designate addresses in the memory means, said address means being pre-settable to any value; and a transfer means for transferring data stored in said memory means to said data processing means, wherein said transferring means is detachably connected to said data processing means; whereby in the connected mode said card member receives address signal from said data processing device to any address in the memory means and the stored data in that address is sequentially read out to said data processing device.

DETAILED DESCRIPTION OF PREFERRED EMBODIMENTS

FIG. 1 shows one example of this invention applied to a laser beam printer as the data processing device. A host machine 12 serves as the host computer causing printer engine 10 to print out the data. A control unit 14 for controlling the printer engine 10 is provided (disposed) between the engine 10 and the host machine 12 (and others). The printer engine 10 records by scanning a laser beam onto a recording medium to record an image which can include characters and/or graphics. The control unit 14 includes a card interface 18 connected to CPU bus 16. A data card 22 serves as an IC (Integrated Circuit) card and is detachably connected to the control unit 14 by a connector 20 which is, in turn, connected to the interface 18. The data card 22 comprises a memory portion storing pattern data for a character font, figure-segment data, image data and/or a part of program data controlling this device. The card interface 18 reads data from the data card 22 as needed and transfers such data to RAM (Random Access Memory) 38. The printer engine 10 is connected to an engine interface 24 and a raster data generator 26, both of which are also connected to the CPU bus 16. The engine interface 24 is in interface relationship with a status and command line 28. The raster data generator is in interface relationship with a video data line 30. The engine interface 24 checks the status of the printer engine and generates a print-command signal thereto. The raster data generator converts the character or graphics-type image data into raster data for transmission to the printer engine. The control unit 14 includes a host interface 32 which receives from the host machine 12 character code, control code and/or image data and transmits a printer-status signal to the host machine 12. The host interface 32 is connected to the CPU bus 16. The control unit 14 includes Central Processing Unit (CPU) 34 connected to the CPU bus 16 and the program ROM 36. Each section of this device is controlled by the action of the CPU 34 which executes the program stored in the program ROM 36. In that execution, the RAM 38 is used as a work area for editing the character code by its page unit and also used as a storing area for the image data or for data from the data card 22 received through the card interface 18 and CPU bus 16. The control unit 14 is also connected to an operation-display panel 40 via the CPU bus 16 and an operation-display interface 42. On the operation-display panel 40 is disposed a switch means for controlling the printer and a display indicating the status of the printer. In this embodiment, it is suitable to store into the data card 22 the data or programs which typically change from time to time in the operation of a laser beam printer.

In this embodiment almost all of the data and/or programs necessary for driving the laser beam printer are stored into the data card 22 while the program ROM 36 stores only a program for the initial program load (IPL). In this embodiment, upon supplying electric power to this device, the IPL of the ROM 36 is initiated to load the data or program necessary for driving the printer from the data card 22 to the RAM 38, and thereafter the CPU 34 can drive the printer in accordance with the stored data in RAM 38. The data card 22 applicable to this embodiment can be the mask-ROM type card shown in FIG. 2 or the PROM type card shown in FIG. 3. It is advantageous to house both types of cards in substantially the same housing which is adapted to the mechanical standard of the connector 20.

Figure 2:
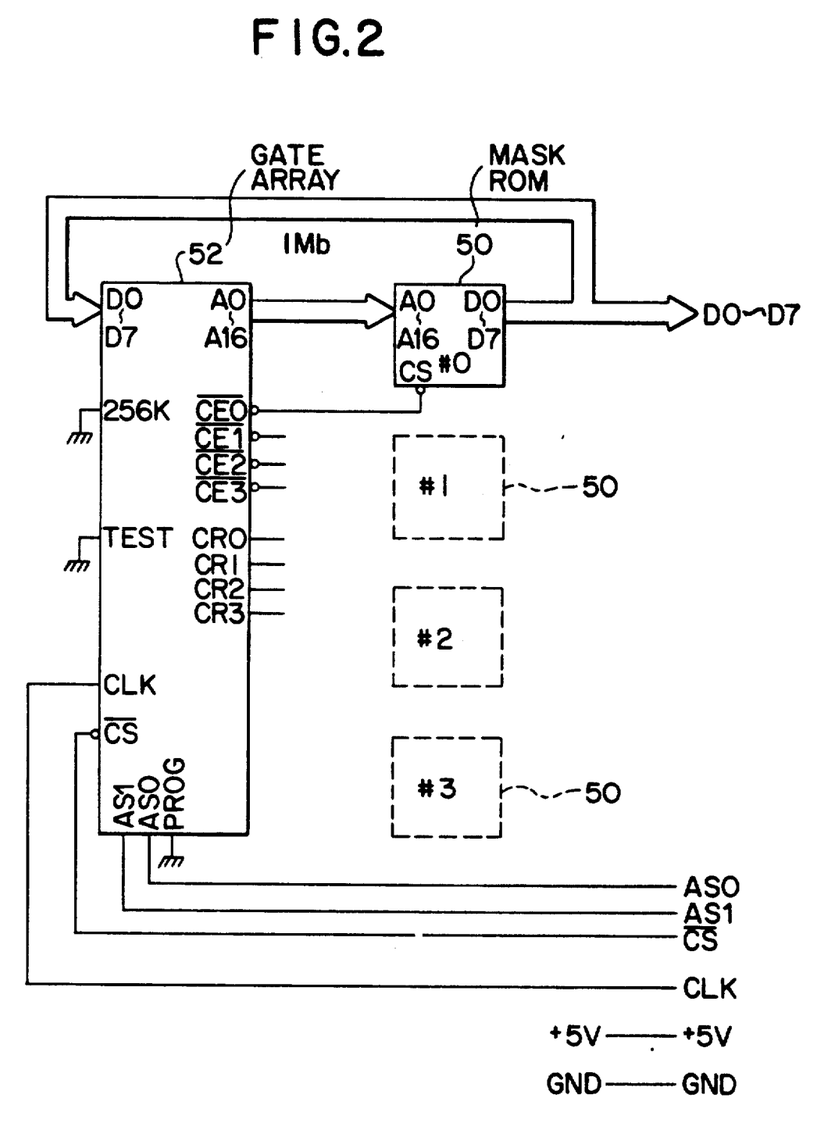
FIG. 2 is a functional block diagram showing a data card member of mask-ROM type used in the embodiment of FIG. 1.

As shown in FIG. 2, the MASK ROM data card 22 comprises MASK ROM chip means 50 of 1 Megabit memory capacity and a gate array means 52 generating addresses for accessing the memory locations in chip means 50.

The gate array means 52 serves as an address generator or an address counter. Several MASK ROMs 50 may be used in this embodiment, for example the four ROMs 50 labelled #0-#3 in FIG. 2. As shown in FIG. 2, the connector of data card 22 has fourteen pins, including 8 pins for parallel data lines $D_0-D_7$ for 8-bits, one pin for a clock-strobe line CLK, two pins for address-select lines AS0 and AS1, one pin for a card-select line CS, one pin for a power supply terminal of +5 V and one pin for a ground line. The data lines $D_0-D_7$ are available for the parallel transmission of 8 bits for input/output functions relative to the card interface 18. The clock-strobe CLK is used as a clock to increment the address counter 52 disposed in the data card 22 and also as a strobe signal for the initiating memory position of sequential data. This signal is supplied from the card interface 18 in a reading mode. Address select lines AS0, AS1 carry a selection signal designating the initiating address for sequential data.

The aforementioned loading of data from card 22 into RAM 38 in control unit 14 is done through parallel transfer of no more than 8 bits at a time. To this end, there is a three-step transfer of each 17-bit ROM address A0–A16 by dividing it into 3 units of no more than 8 bits transferred over the 8 data lines D0–D7. When both bits of AS1 and AS0 are set to "0" by a signal received from the card interface 18 in the reading mode, the reading mode for the ROM 50 is designated. When the address-select bits AS1 and AS0 are set to "0" and "1", respectively, the address bits A0–A7 are designated for transmission over lines D0–D7 in parallel.

In like manner, settings AS1 and AS0 to "1" and "0" and setting AS1 and AS0 to "1" and "1", respectively, designate the address bits A8–A15 and the address bits A16–A19, respectively, for transmission over lines D0–D7 in parallel.

The card select pin CS selects the data card 22 when it is rendered to low-level L by receiving a signal from the card interface 18 in the reading mode.

Figure 3:
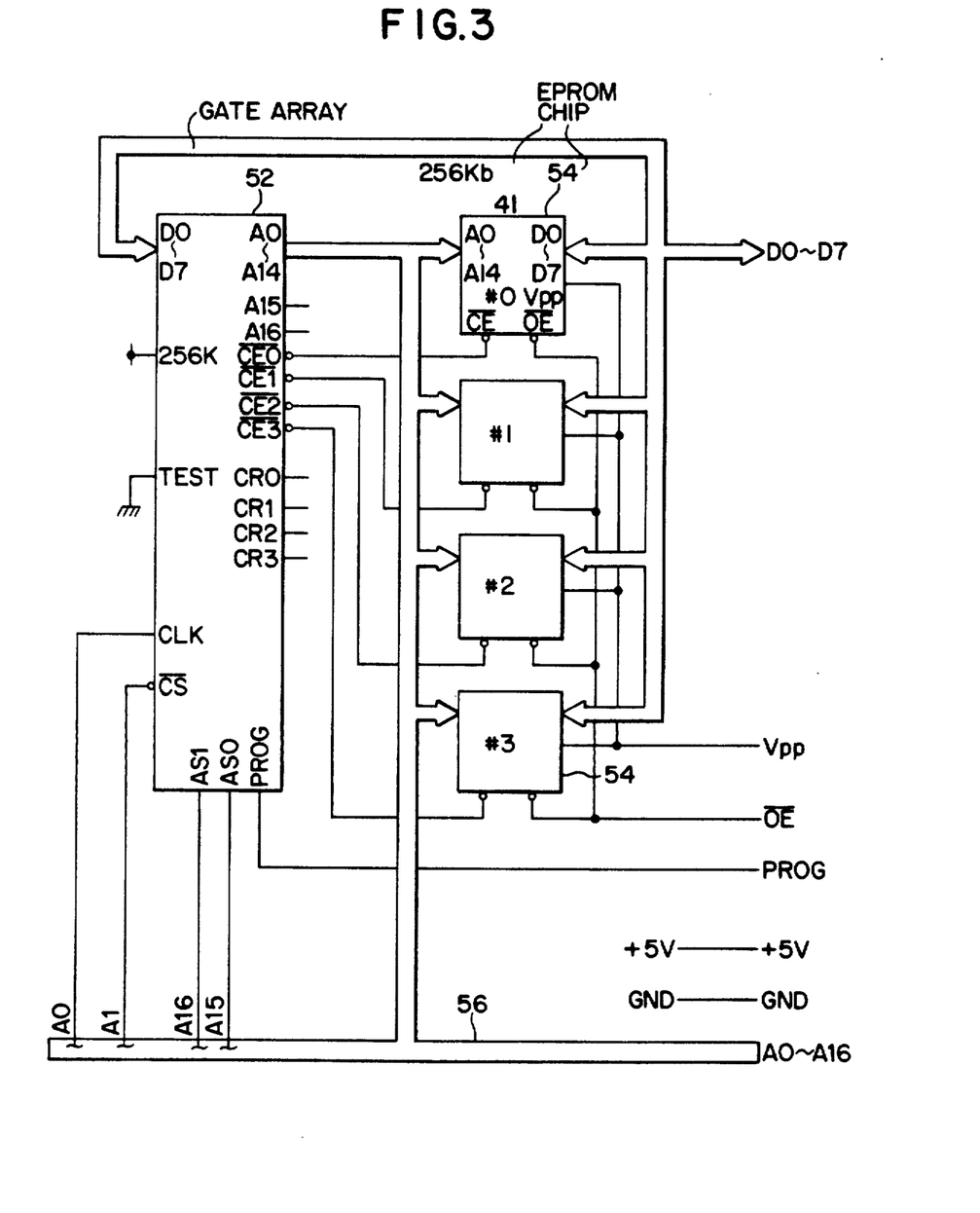
FIG. 3 is a functional block diagram showing a data card member of PROM type.

Instead of a mask-ROM type card, a PROM type card can be used, as shown in FIG. 3, such as an ultraviolet-erasable PROM. In the embodiments described here an EPROM card is used which limits the writing of data to one-time and has no erase-window for ultraviolet light erasing. The writing of the data is carried out by an external writing device for PROM chips.

The PROM-type data card in this embodiment includes PROM chip means 54 comprising four chips (#0-#3) of 128 kilo-bits in memory capacity each, an address line 56 for writing thereto and a gate array means used as an address counter 52 for generating the read-out address of PROM 54. The four chips comprising PROM 54 can be addressed independently.

As is understood from the figure, the connector of the PROM-type data card 22 of FIG. 3 has no address-select lines AS0, AS1 or a card select line CS. In place of them, it has chip-enable lines CE0-CE3, ROM address lines A0–A16, output enable-line OE and a program voltage line Vpp. The other signal lines are the same as in the pin arrangement of the MASK-ROM data card. The total number of pins is 30: pins A0–A16, a grounding pin GND, a power supply pin 5 V, a programming pin PROG, an output enable pin OE, a program Voltage pin $V_{pp}$, and data line pins D0–D7.

The ROM address lines A0–A16 are address lines for programming EPROM 54, and are connected to a writing device for PROM. The chip enable lines CE0 and CE1 carry the selection signals of each chip 54 in programming thereof. The #0 chip of EPROM 54 is designated by setting both bits CE0 and CE1 to "0"; the #1 chip by setting CE0 and CE1 to "0" and "1", respectively; #2 chips by setting "1" and "0"; and #3 chip by setting "1" and "1".

Figure 5:
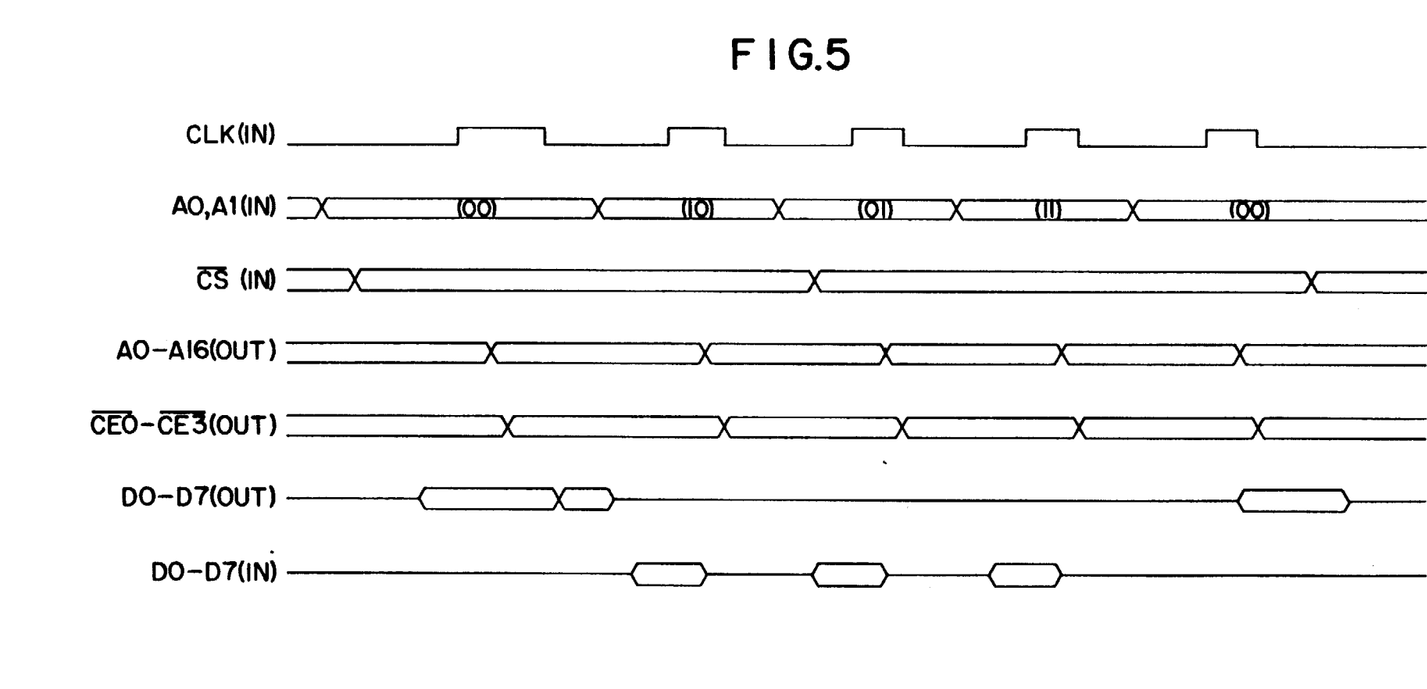
FIG. 5 is a time chart showing read-out conditions of the data card.

The program mode line PROG becomes high-level H by the action of an external writing device for PROMs in the program mode to allow for programming of EPROM 54. In the read-out mode of reading data from EPROM 54, the card interface 18 (FIGS. 1 and 3) places line PROG in low-level condition. The output enable OE is a signal for enabling the four EPROM chips 54 all at once and is placed at low-level by the card interface 18 in the read-out mode. FIG. 5 is a time chart showing read-out conditions of the data card shown in FIG. 2 or FIG. 3.

Figure 4:
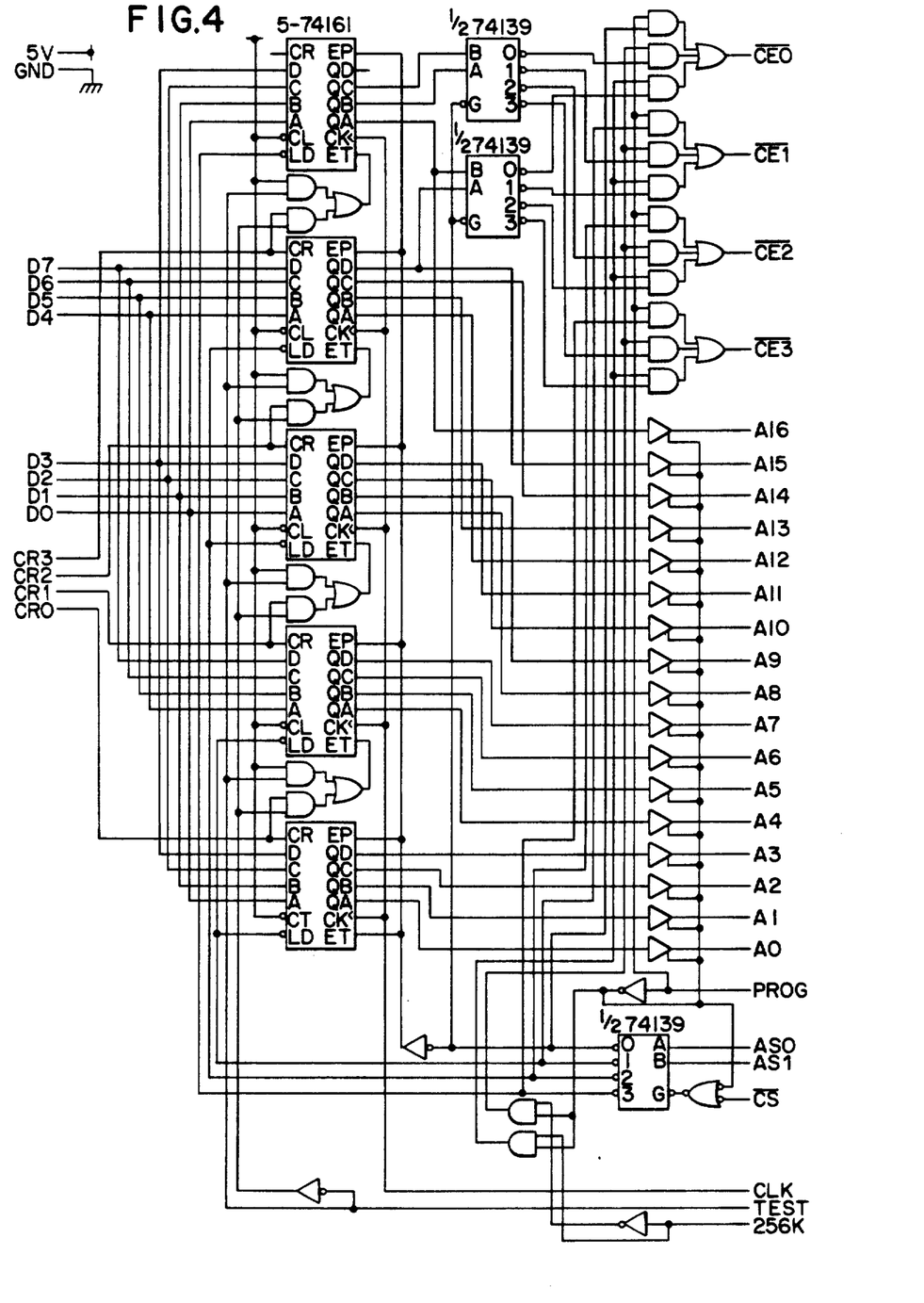
FIG. 4 is a functional block diagram showing one example of an address counter to be used in the data card member of FIGS. 2 and 3.
Figure 6:
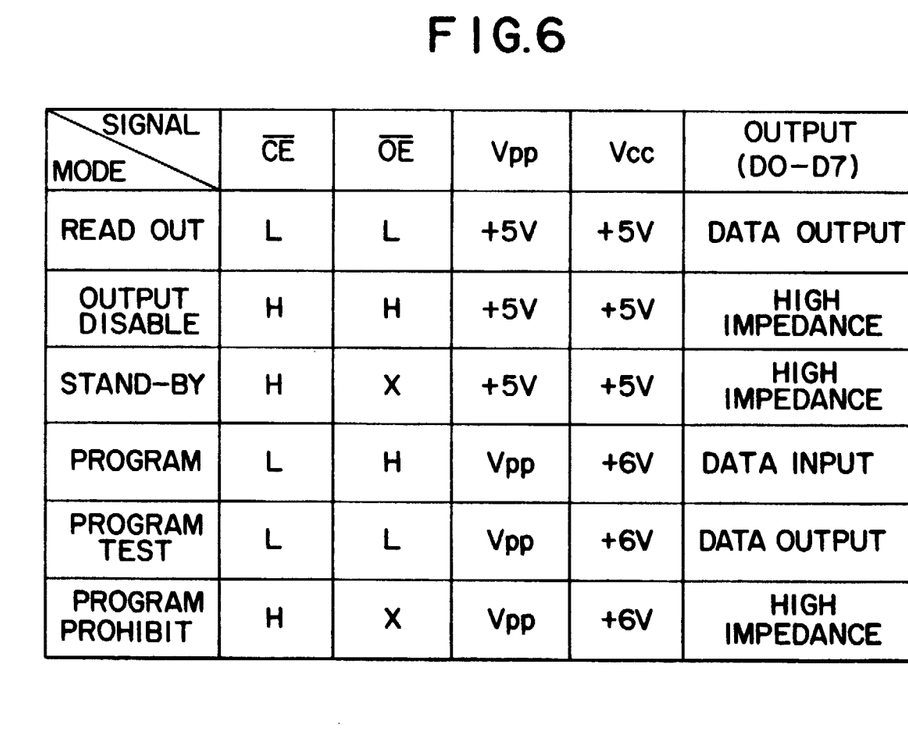
FIG. 6 is a table showing relationships of signal conditions between respective modes.

As shown in FIG. 6, the program voltage Vpp pin is at the same voltage as the power supply voltage +5 V from the card interface 18 in the data output mode of the card 22, but also receives the predetermined voltage Vpp from an external writing device in the program mode. In FIG. 6, "X" represents "don't care" in the high or low level. The address counter 52 can be implemented by either MASK-ROM or PROM and, as understood from FIGS. 2 and 3, there is some difference in connection between them. Greater detail is depicted in FIG. 4.

In writing data into the PROM 54, the address output A0–A16 are in a floating condition and the chip select lines CE0, CE1 become effective. This allows writing addressees to be selected from outside of the data card 22, that is from an external device for writing into PROMs. In the address counter 52 is established the initial address for reading stored data from the memory 50 or 54 of the data card 22. The setting of the initial memory position address and the reading out of data in three stages by using the input data lines $D_0$–$D_7$, the card select line CS, the address select lines AS0, AS1 and the clock strobe line CLK. is carried out in a manner similar to that discussed above in connection with the ROM-type card 22. The address counter 52 successively generates read-out addresses starting from the pre-set memory (address) position in response to the clock strobe CLK. In accordance with such incremental action, the output data $D_0$–$D_7$ sequentially carry outputs each comprising no more than 8 bits in parallel.

As is described above, the data card of ROM type includes the address counter 52. Accordingly, the interface only needs a small number of pins, fourteen pins in this example, and is arranged such that the requested data is read out only as needed. Since the number of connection pins is reduced and unneeded connection lines are electrically isolated, errors caused by moving the data card and/or by exposure to electromagnetic radiation are reduced.

The data card of EPROM type may be connected to the interface by 30 pins and data may be written into the card by using an external PROM loading device. This type of a data card 22 is particularly advantageous for rapid designing and manufacturing data cards or the control unit 14.

In this embodiment of this invention, the connection between the data card 22 and the control unit 14 is achieved by fourteen or thirty pin-terminals and the construction of the connector 20 is thereby simplified as compared with the prior art, where it is believed that a connector having forty-two or forty-five pins is required to connect a 16-bit IC card to the CPU bus. In comparison with such prior device, the connection between the data card 22 and the control unit 14 according to the invention is simplified.

The data stored in the data card 22 are read as needed into the RAM 38 in a short time and thereafter the interface between the data card 22 and the control unit 14 is rendered electrically isolated. Accordingly, data errors due to pulling out or moving the data card 22 are reduced, as is vulnerable to electromagnetic interference.

Since the same construction is adopted in outward shape, read-out interface and reading-out functions of both MASK-ROM and EPROM data cards 22, flexibility is afforded for design changes even after the introduction of a laser beam printer incorporating the control unit 14. Specifically, product introduction can be speeded up by first providing a data card of EPROM type with which the laser printer can be introduced, and then a MASK-ROM data card can be developed for mass production at a lower cost.

This invention can be effectively applied to a data processing device using an IC card such as a dot printer, other types of printers, or other display devices as well as to a laser beam printer.

In another embodiment, a data card is used for the additional function of evaluating the characteristics of the device to which it can be detachably affixed. In this embodiment, the data card stores data for evaluating characteristics of the device to which it is applied such as printed-out character quality, a printing operation, the accuracy of controlling printing movement and/or data to help debug software.

Figure 7:
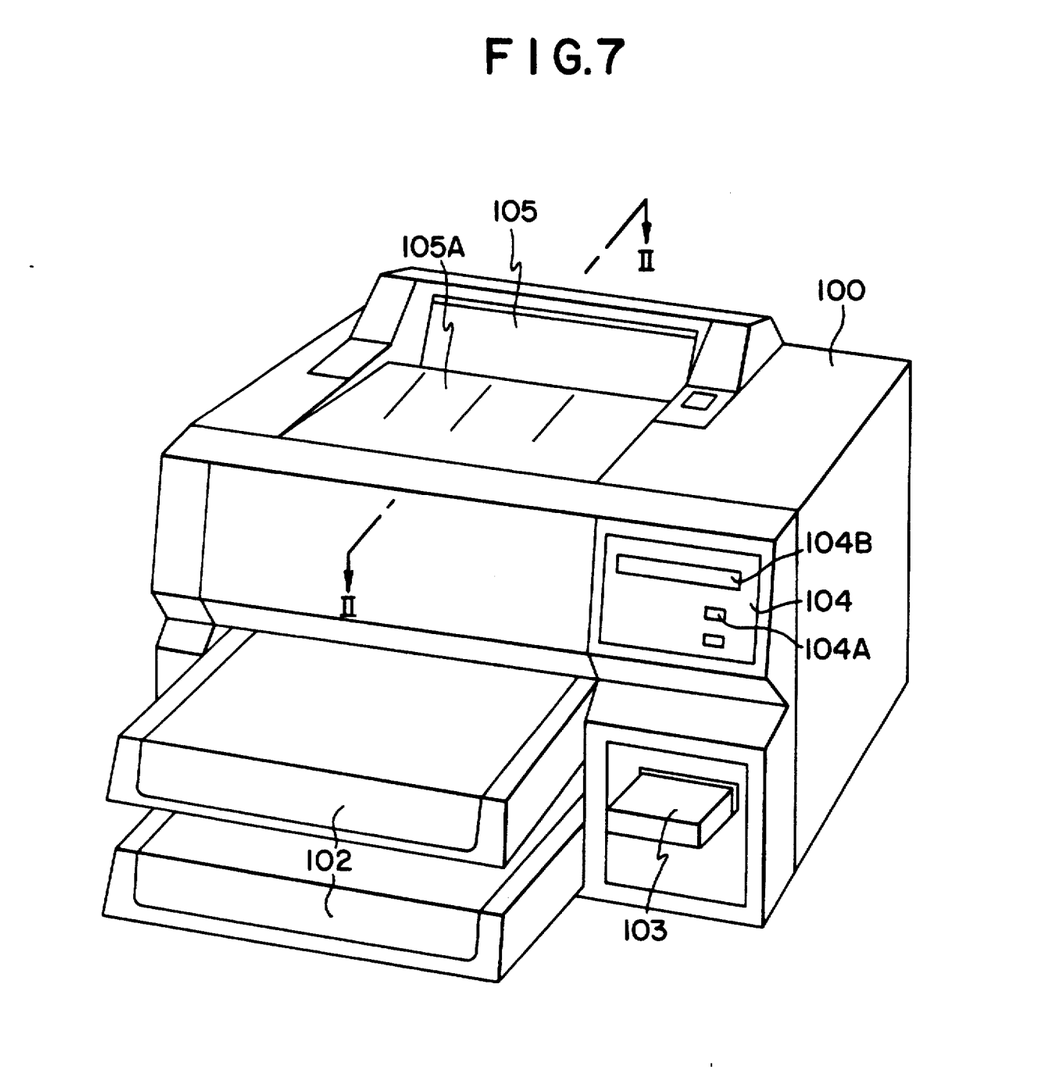
FIG. 7 is a perspective view showing a laser printer using another embodiment of a data card.
Figure 8:
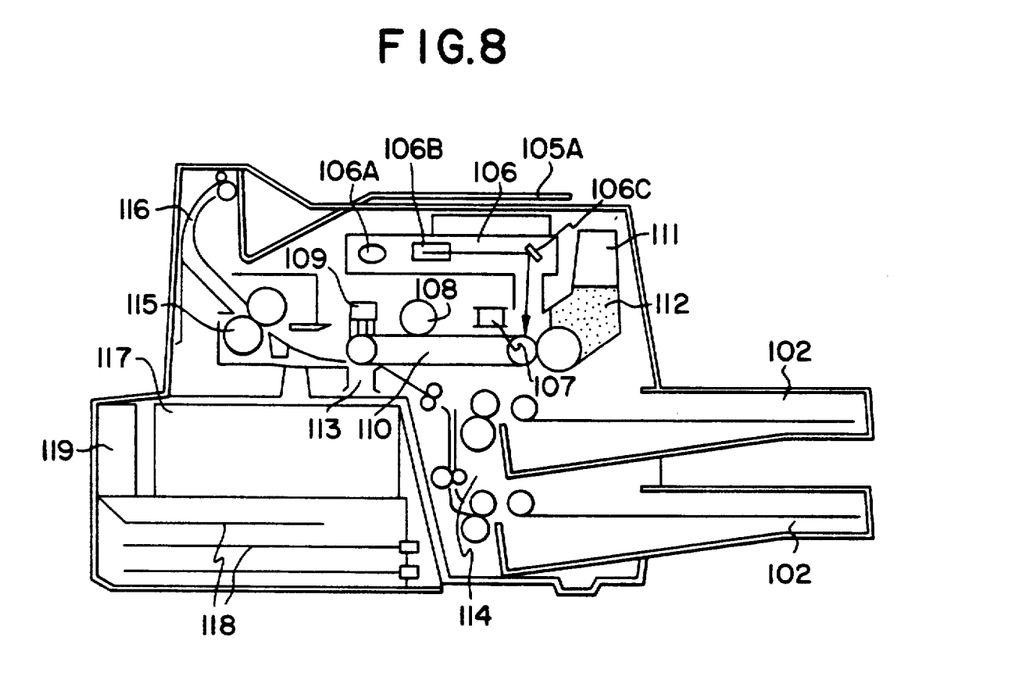
FIG. 8 is a cross-sectional view along line II—II of FIG. 7.

In FIGS. 7 and 8, a laser beam printer 100 applicable to this system includes a tray 102 for paper supply and a cartridge 103, both of which are detachably affixed to the front body of the printer. The cartridge 103 houses memory means such as ROM or RAM storing data of the kind shown in FIG. 10 and/or memory means storing data for evaluation tests of the kind shown in FIG. 11. On the body 100 is mounted an operation panel 104 having a test switch 104A and a display 104B in addition to a control switch means for the printer. On the upper portion of the printer 100, there is disposed a printout paper outlet 105 and a receiving tray 105A.

Figure 10:
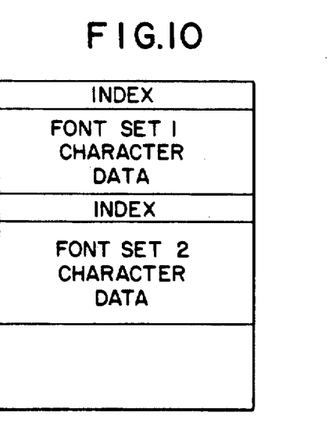
FIG. 10 shows character data stored in a card member for use in the printer of FIG. 7.
Figure 11:
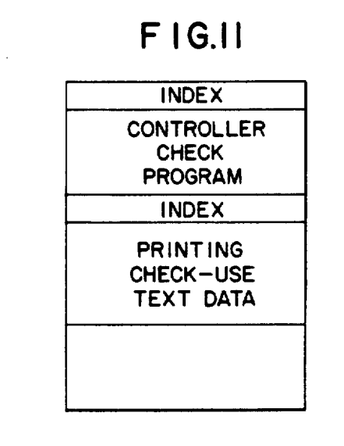
FIG. 11 shows data for evaluation test stored in a card member for use in the printer of FIG. 7.

As is shown in FIG. 10, the memory means for character data stores INDEX, FONT SET 1, CHARACTER DATA, INDEX, FONT SET 2, and CHARACTER DATA in the described order. The memory means for text data for evaluation stores an INDEX for a controller-test program, a PROGRAM for testing the controller, an INDEX for a printing-test program, and TEXT for testing the printer, in the described order. An exemplary format for the index is as follows. The index number 0–7FH, 80H–8FH, and 90H–9FH are character data, program for testing the controller, and text data for testing, respectively. Each index number is represented by 16 decimal numbers.

In FIG. 8, a light-writing portion 106 comprises a laser beam generating device 106A, a rotating polygon mirror 106B, and a reflecting mirror 106C. The printer 100 includes a charging means 107, a cleaning means 108, a neutralizing means 109, a magazine 110 for an organic photoconductive belt member, a cartridge 111 for toner replenishment, a developing means 112, a transfer means 113, a paper supply means 114, a fixing means 115, a paper feed path 116, a control means 117 for the printer having a power supply, a controller 118 having a print board material, and fan 119.

Figure 9:
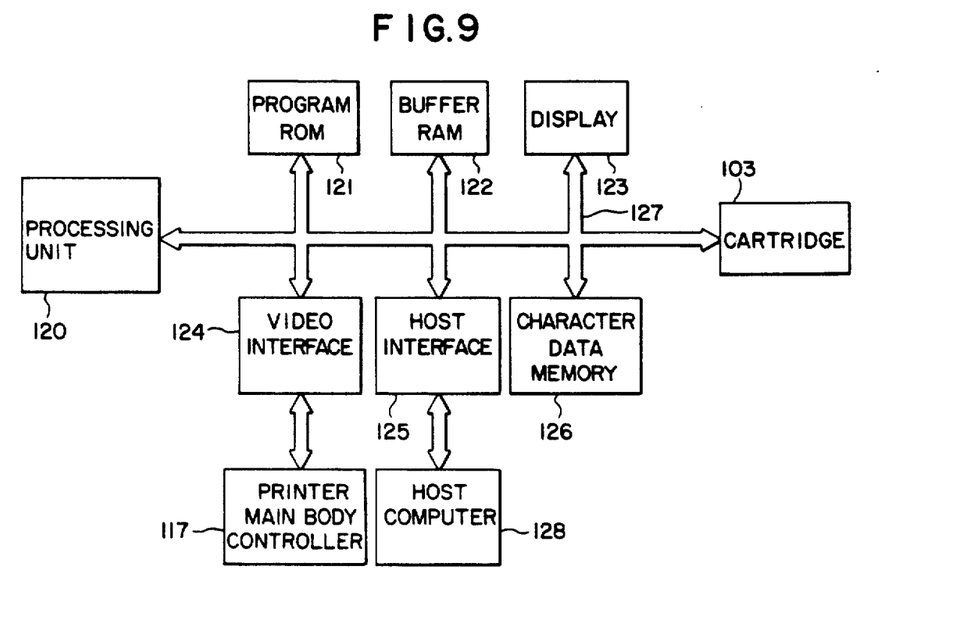
FIG. 9 is a block diagram showing a controller for the printer in FIG. 7.

In FIG. 9, the controller 118 comprises a central processing unit 120, which can be a microcomputer, ROM 121 for a device-operating program, RAM 122 for buffer memory, a display 123, an interface 124 for video data, an interface 125 for a host computer, the cartridge 103, and a memory 126 for storing character data, respective sections being electrically connected with each other through a data bus 127. The interface 124 is connected to the controller 117 for the printer and the interface 125 for the host computer 128.

The operation of this printer is described below.

In FIG. 8, a character or a graphics signal transferred from the cartridge 103 is converted into a write-data signal by the controller 118 and the converted signal is input to the printer controller 117 to drive the printer. At this time, the write-data signal is converted to a video signal causing the laser beam generating device 106A to turn on and off. The signal from the generating device is applied onto a photoconductive belt bearing thereon a uniform charge to thereby form an electrostatic latent image. This image is developed, transferred to copy paper and fixed thereto in the fixing means 115 to thereby form a permanent visible image.

The operation for the evaluating test according to this system is explained hereinafter.

Figure 12:
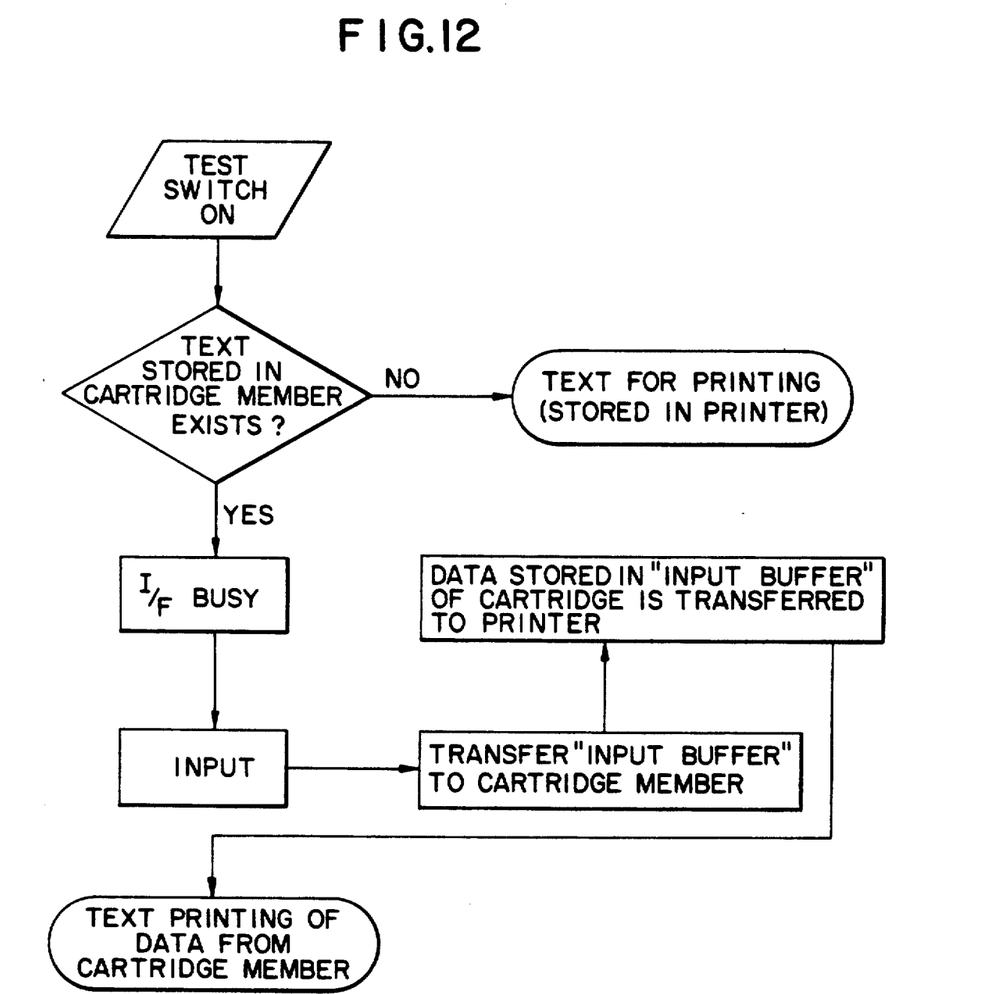
FIG. 12 is a flow chart of an evaluation test applicable to the printer of FIG. 7.

FIG. 12 is a flow chart indicating the working of the evaluation test according to this system.

As seen in FIG. 12, if no data for an evaluation test are stored in cartridge 103, pushing the test switch 104A for evaluation test causes the system to print out the text for testing-use stored in the printer. In case the cartridge contains data for testing-use, pushing the same switch 104A renders the interface 125 for the host computer "busy." Thereafter, test data from cartridge 103 are transferred, as discussed above, to an input buffer which is a part of the RAM memory of printer controller 117. In this mode the printer controller 117 treats the test data from cartridge 103 in the same manner it normally treats first data from the host computer 128 or from other sources in other modes, i.e. printer controller 117 uses the test data transferred to the input buffer area in its RAM memory to carry out the tests specified by said data, e.g. to cause the laser printer to print out a test pattern. After the completion of printing the whole text data, the "Input Buffer" is restored to the beginning position and the interface 125 is rendered to "ready" status. The controller 117 in the printer usually recognizes RAM 122 as "Input Buffer" memory area. However in SW-ON and cartridge-text loading condition, the address of "Input Buffer" recognized by the controller 117 is changed by the program to that of the relevant data area in the cartridge 103.

As described above, a printer according to the invention includes outside memory means detachably affixed to the main body, with text information for testing stored in said memory means, and said text information is printed out as needed. Accordingly, text for various evaluation tests is available from the data card or cartridge (22 or 103) and can be used in the final assembly and testing of the printer without the necessity of the host computer, as in prior art devices of this type. Further, various other evaluating tests can be carried out as the printer is being checked out, by using the text stored in the outside memory means, namely the card member. Still further, the text in the card member can be used to check the operation of the control code for the printer.

Known prior-art printers are believed incapable of carrying out by themselves tests such as printed-out character quality, printing operation, accuracy of controlling printing operations under software commands, and/or software debugging. Internal memory in the printer is required to make such tests but it is expensive to provide such internal memory, and a host computer is usually required for that purpose. However, such method necessarily limits such tests to a time and place when the host computer is available. The invented system removes this limitation.

What we claim is:

1. A detachable memory unit detachably connectable to a main body, wherein said main body comprises data processing means and interface means and main body terminals, and wherein said detachable memory unit comprises:

memory means for storing multibit data at respective addresses;

an internal address generator coupled to said memory means for designating said addresses in said memory means, said multibit data being stored at said addresses, respectively;

first electric connection terminals coupled to said memory means and to said internal address generator, said first terminals being in electrical contact with said main body terminals when said memory unit is connected to said main body;

first electric connection terminals coupled to said internal address generator, said second terminals being in electrical contact with said main body terminals when said memory unit is connected to said main body;

wherein when connected to said main body such that said first and second terminals of the detachable memory unit are in electrical contact with said main body terminals, said detachable memory unit is responsive to a mode signal transmitted from the main body to said second terminals to operate in a first mode in which said internal address generator is responsive to starting address signals transmitted from the main body through said first terminals to generate a starting address and thereafter independently operates to generate subsequent addresses and said memory means is responsive to said starting address and said subsequent addresses to transmit to said main body, through said same first terminals, data stored in said memory means at addresses specified by said starting and subsequent addresses.

2. A detachable memory unit as in claim 1, wherein in said first mode said main body transmits to said detachable memory unit successive portions of said starting address signals during successive time intervals.

3. A detachable memory unit as in claim 1 in which the number of addresses in said memory means is $2^N$ or greater, where N is the number of said second electric connection terminals.

4. A detachable memory unit as in claim 1 in which said detachable memory unit comprises third electric connection terminal for receiving first electric power from said main body.

5. A detachable memory unit as in claim 4 in which said memory means comprises an electrically programmable Read-Only-Memory and said detachable memory unit comprises fourth electric connection terminal for receiving second electric power different from said first electric power and supplying said second electric power to said electrically programmable Read-Only-Memory.

6. A detachable memory unit detachably connected to a main body which comprises data processing means and interface means;

said detachable memory unit comprising:

memory means for storing multibit data at respective addresses;

an internal address generator coupled to said memory means for designating said addresses in said memory means, said multibit data being stored at said addresses, respectively;

a plurality of first electric connection terminals which are connected to said memory means and to said address generator and are connectable to said main body for selectively receiving a starting address from the main body and transferring said stored multibit data to said main body;

second electric connection terminals connected to said memory means and connectable to said main body for receiving from said main body a mode signal designating the transmission of a starting address from the main body to the memory unit for reading out stored data from said memory means; and means in said detachable memory unit for transferring data stored at said designated starting address in said memory means to said main body through said first electric connection terminals and for thereafter sequentially transferring to said main body through said first electric connection terminals data stored at addresses in said memory means which sequentially follow said starting address.

7. A detachable memory unit as in claim 6, in which said designation of said starting address for reading out said stored data through said second electric connection terminals is performed in sequential steps such that only a part of said starting address is designated in any one of said steps.

8. A detachable memory unit as in claim 6, in which said memory means has a memory address capacity equal to or more than $2^N$ addresses, wherein N is the number of said second electric connection terminals through which a starting address for reading out said stored data can be designated.

9. A detachable memory unit as in claim 6, in which said detachable memory unit comprises third electric connection terminal for receiving first electric power from said main body for powering a selected portion of said detachable memory unit.

10. A detachable memory unit as in claim 9, in which said memory means comprises an electrically programmable Read-Only-Memory and said detachable memory unit comprises fourth electric connection terminal for receiving, from said main body, second electric power different from said first electric power and supplying said second electric power to said electrically programmable Read-Only-Memory.

11. A detachable memory unit detachably connectable to a main body, wherein said main body comprises data processing means and interface means and wherein said detachably connectable memory unit comprises:
unit memory means for storing multibit data words at respective word addresses;
an internal address generator coupled to said memory means for designating said addresses in said memory means, said multibit data being stored at said addresses, respectively;
a plurality of first electric connection terminals through each of which data or address information can be transferred between said main body and said unit memory means;
a second electric connection terminal through which said main body can send a mode signal designating a starting address to data words stored in said unit memory means; and
transfer means which are in said unit and are coupled to said address generator and to said memory and are responsive to the receipt of said mode signal transferred thereto from said main body through said second terminal to transfer from said unit to said main body, through said first terminals, data stored at said designated starting address and thereafter to transfer sequentially data stored at addresses in said unit which sequentially follow said starting address.

12. A memory unit which is detachably connectable to a main body, wherein said main body comprises data processing means and interface means, and wherein said detachably connectable memory unit comprises:
unit memory means for storing multibit data at respective addresses;
an address counter for designating said addresses in said unit memory means, said multibit data being stored at said addresses, respectively;
first electric connection terminal means through each of which address and data information can be transferred between said main body and said unit memory means in said detachably connectable memory unit;
second electric connection terminal means through which said main body can send a signal for designating a read/write mode to said detachably connectable memory unit and for designating a starting address to be transmitted from the main body to the detachably connectable memory unit through said first electric connection terminal means such that addresses are divided in plural groups, said starting address being transmitted in a succession of groups of bits; and
transfer means for incrementing said address counter in said memory unit and for initiating memory position of sequential data, wherein:
first, in response to the receipt of said read/write mode signal transferred to said memory unit from said main body through said second electric connection terminal means, data stored at said designated starting address are transferred to said main body from said memory unit through said first electric connection terminal means, and
thereafter, data stored at addresses in said memory unit which sequentially follow said readout starting address are transferred sequentially from said memory unit through said first electric connection terminal means.

13. A memory unit as in claim 12, in which said designation of said starting address for reading out said stored data through said second electric connection terminal means is performed in successive groups of designations, in a selected time sequence.

14. A memory unit as in claim 12, in which said unit memory means has a memory address capacity equal to or more than $2^N$ addresses, wherein N is the number of the electric connection terminals necessary for designating said starting address for reading out said data stored in said unit memory means.

15. A memory unit as in claim 12, said memory unit further comprising third electric connection terminal means for receiving first electric power from said main body and supplying said first power to selected portions of said memory unit.

16. A memory unit as in claim 15, in which said unit memory means comprise an electrically programmable Read-Only-Memory, and said memory unit comprises fourth electric connection terminal means for receiving, from said main body, second electric power different from said first electric power and supplying said second electric power to said electrically programmable Read-Only-Memory.

17. A memory unit as in claim 12 in which said second electric connection terminals means include means through which said main body can send a signal selecting the memory unit.

18. A memory unit as in claim 12 including third electric connection terminals coupled with said unit memory means for programming said unit memory means by supplying address information through said third electric connection terminals identifying locations in said unit memory means and supplying data to be stored in the identified locations through said first electric connection terminal means.

19. A memory unit as in claim 18 in which said unit memory means comprise EPROM storage devices, and including means for disabling said address counter while EPROM devices are being programmed.

* * * * *